United States Patent [19]

Giletti

[11] 4,166,512

[45] Sep. 4, 1979

[54] CHASSIS FOR OFF-THE-ROAD VEHICLES

[76] Inventor: Emilio Giletti, 13064 Via Provinciale, 51, Ponzone Biellese, Italy

[21] Appl. No.: 849,836

[22] Filed: Nov. 9, 1977

[51] Int. Cl.$^2$ ............................................ B62D 55/00
[52] U.S. Cl. .................................................. 180/9.64
[58] Field of Search .......................................... 180/9.64

[56] References Cited
U.S. PATENT DOCUMENTS 2,800,188  7/1957  Garrett ........................... 180/9.64 X Primary Examiner—Joseph F. Peters, Jr.
Assistant Examiner—Gene A. Church
Attorney, Agent, or Firm—Ladas, Parry, Von Gehr, Goldsmith & Deschamps

[57] ABSTRACT

A chassis for a vehicle of the type in which all the wheels are driving wheels, the motion being transmitted from the engine to the wheels by means of a drive comprising sprocket wheels connected to the axles of the wheels of the vehicle and actuated by driving chains, is described.

The chassis comprises at least a pair of side members connected to at least two cross members, each of said side members supporting all the wheels situated on one side of the vehicle, having such a configuration as to define a closed recess which contains said sprocket wheels and said chains, and being provided with a wall having resting thereon a portion of the body of the vehicle.

8 Claims, 4 Drawing Figures

4,166,512

CHASSIS FOR OFF-THE-ROAD VEHICLES

BACKGROUND OF THE INVENTION

The present invention relates to a chassis for an off-the-road vehicle of the type in which all the wheels are driving wheels, said vehicle being also apt to travel on sheets of water wherefore it is provided with a water-tight body.

The chassis according to the present invention allows to concentrate the structural elements in close proximity to the wheels, thus leaving a free space of considerable dimensions (particularly in height) below the vehicle, as is required in order to avoid that when the vehicle is travelling on an uneven ground the obstacles of the ground may strike against the chassis; the chassis according to the invention allows also an easy and immediate access to the members which transmit the motion to the driving wheels, thereby considerably facilitating the inspection and the adjustment of said members or the substitution of damaged parts of the same; finally, the chassis of the present invention has a very simple and sturdy structure, as well as a moderate weight.

As is known, the vehicles of this type comprise a water-tight body normally made of plastics, within which there are disposed metallic stiffening elements which support the members transmitting the motion and form the true chassis of the vehicle. The motion is transmitted to the driving axles by means of sprocket wheel actuated by driving chains, and the control of the ride direction of the vehicle is achieved by braking the driving wheels disposed on one of the sides of the vehicle.

With the structure described hereinabove the distance of the lowermost portion of the vehicle from the ground is rather moderate, since the true chassis is housed within the body; another disadvantage is given by the poor water-tightness of the body, since the latter is traversed by the driving axles; a further disadvantage derives from the poor accessibility of the driving members housed within parts which in turn are disposed inside the body.

It is an object of the present invention to provide a chassis for a vehicle of the type specified, which will be free from the disadvantages mentioned hereinabove.

SUMMARY OF THE INVENTION

The present invention provides a chassis for a vehicle of the type in which all the wheels are driving wheels, the motion being transmitted from the engine to the wheels by means of a drive comprising sprocket wheels connected to the axles of the wheels and actuated by driving chains, characterized in that it comprises at least one pair of side members connected to at least two cross members, each of said side members supporting all the wheels situated on one side of the vehicle, having such a configuration as to define a closed recess which contains said sprocket wheels and said chains, and being provided with a wall on which rests a portion of the body of the vehicle.

BRIEF DESCRIPTION OF THE DRAWINGS

For a better understanding of the invention a particular body thereof will now be described with reference to the accompanying drawings, in which.

DETAILED DESCRIPTION OF THE INVENTION

The chassis according to the present invention is intended to be applied to an off-the-road vehicle of the type briefly described hereinabove, comprising four or more driving wheels (8 in the present embodiment), to which the motion is transmitted by means of sprocket wheels actuated by chains; as is known, the control of the direction of ride of a vehicle of this type is achieved by means of at least two brakes inserted into the drive, which may be alternatively actuated to lock the wheels situated on one side of the vehicle.

Figure 3:
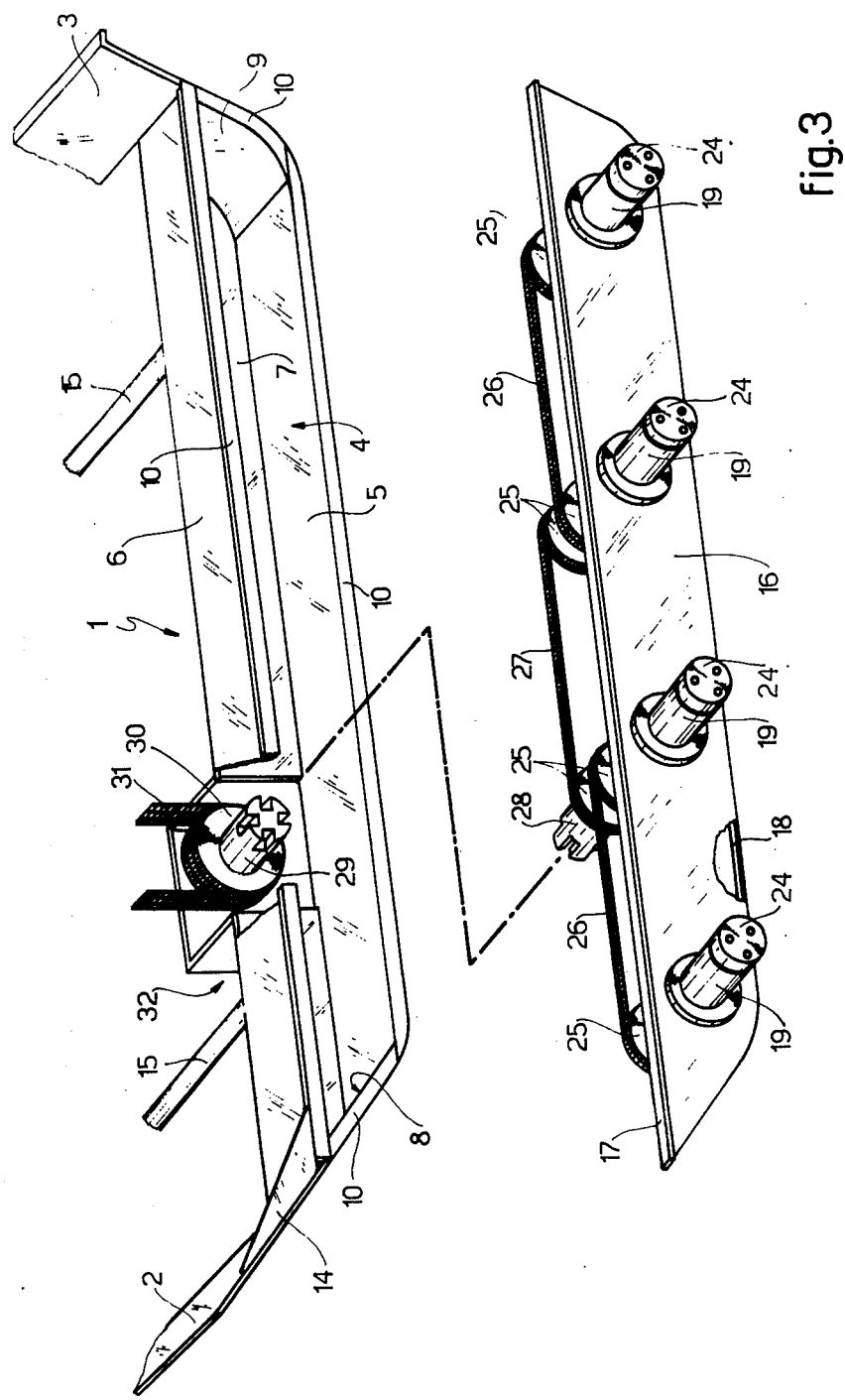
FIG. 3 is a partial perspective view, with parts shown in an exploded representation, of said chassis.

The chassis of the present invention comprises a pair of parallel side members 1, only one of them being shown in FIG. 3, which are rigidly connected to each other by means of plates, namely a front plate 2 and a rear plate 3.

Figure 4:
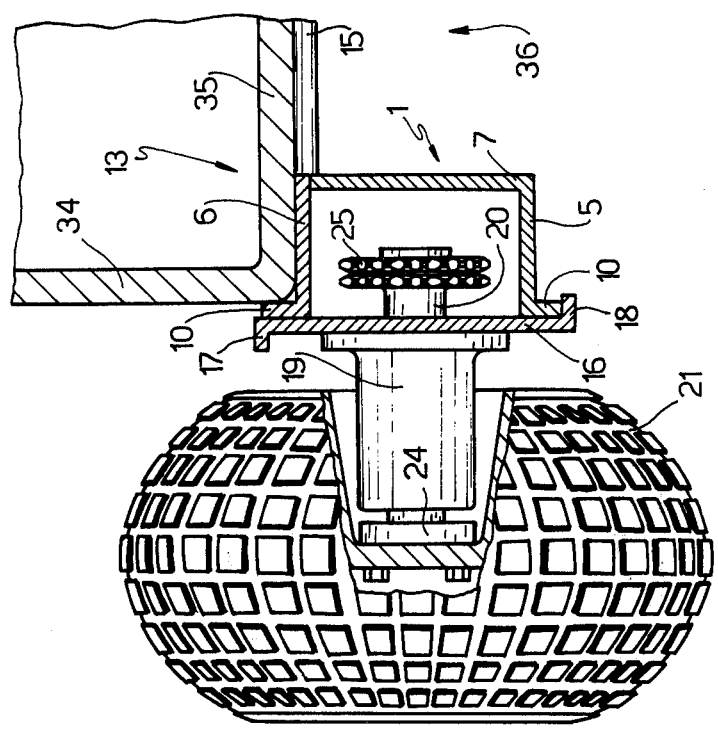
FIG. 4 is a cross-sectional view of a portion of the chassis of the invention, taken in the region of one of the driving wheels of the vehicle.

Each side member is shaped in such a way as to define a recess 4 and therefore comprises a lower wall 5, an upper wall 6, a bottom wall 7 and end walls 8 and 9. Conveniently, said parts may be formed separately, as is the case of the walls 6, 8 and 9, or some of them may be formed from the same element, as is the case of the walls 5 and 7 (FIG. 4). Anyway, they are connected to one another, for example by welding, so as to obtain a very sturdy unitary structure. The edges of said walls, which face one side of the vehicle, are bent, substantially by 90°, as clearly shown in FIGS. 3 and 4, so as to originate support tabs 10 which surround said recess 4 (FIG. 3).

Figure 1:
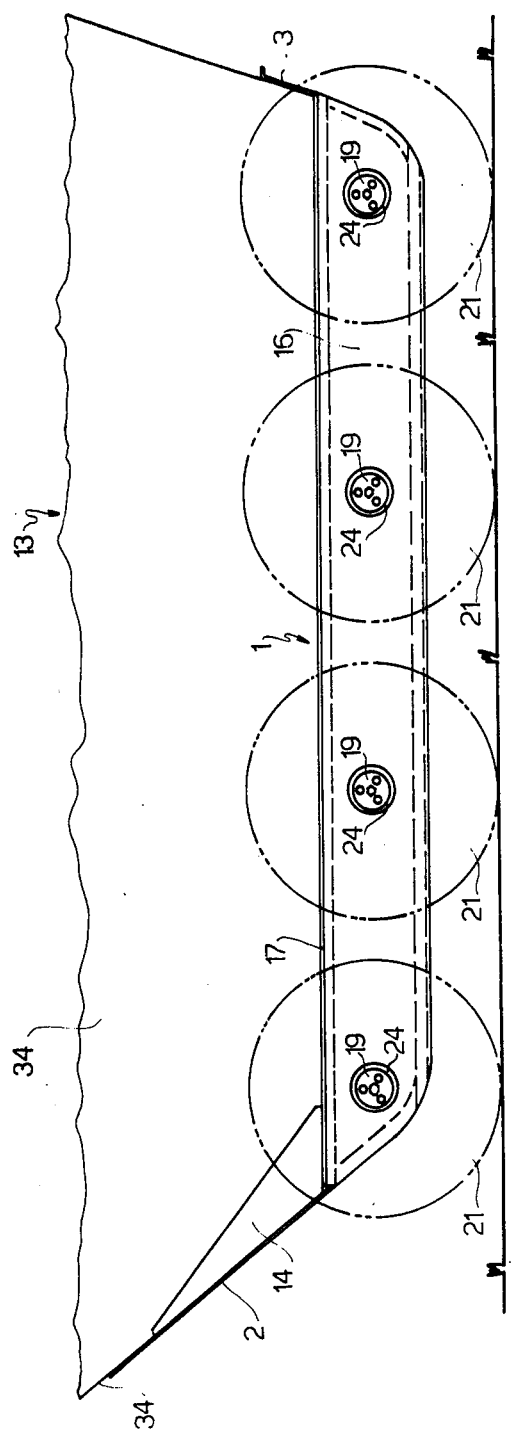
FIG. 1 is a diagrammatic side elevational view of the chassis according to the present invention.

The front plate 2 and the rear plate 3 are substantially plane and sloping suitably with respect to the side members, so as to define, together with these latter, a seating for the body 13 of the vehicle (FIG. 1); said plates are rigidly connected, at their lower edge, to the side members 1, for example by welding, as clearly visible in FIG. 3; such connection may be improved by means of struts 14.

Conveniently, but not necessarily, the connection between the two side members may include also cross members 15, which in the embodiment shown are tubular in shape, fixed adjacent the upper walls 6 of the side members 1.

The chassis according to the invention comprises also a pair of closure plates 16 for the side members (FIGS. 3 and 4) each of which is shaped in such a manner that when it is brought into contact with the tabs 10 of the side members it closes the recess 4, as can be seen in FIG. 4. Each of said plates has a profile which substantially coincides with that of the tabs 10, and is conveniently provided with bent edges, namely an upper edge 17 and a lower edge 18 (FIG. 4), which are apt to stiffen the plate and to allow a better connection of the latter with the respective side member 1; this is obtained by removable connection means, as for instance screws, bolts or the like (not shown).

Connected to each plate 16 are support bushings 19 (FIGS. 3 and 4) for the axles 20 of the driving wheels 21 (FIG. 4); conveniently, each bushing is provided with a pair of rolling bearings (not shown) arranged to support the respective axle which has an end flange 24 on which the wheel is fixed. Each axle is provided with at least one sprocket wheel 25 arranged to receive a driving chain 26; the two central axles of the four-axle arrangement shown in the drawings are provided with two sprocket wheels, one of which allows the transmission of the motion to one end axle, and the other allows the transmission of the motion to the other central axle.

The end of one of the central axles is provided with a front coupling element 28, for example of the type with teeth, arranged to engage a corresponding coupling element 29 carried by one side member 1. Said coupling element is rigidly connected to a sprocket wheel 30 which is driven, by means of the chain 31, by the engine of the vehicle (not shown). Conveniently, these parts (element 29, sprocket wheel 30, chain 31) are housed in a box 32 formed in the bottom wall 7 of a side member.

The body 13 of the vehicle, a portion of which is shown in FIG. 4, is of the closed type, having the shape of a tank and comprising side and bottom walls 34 and 35 respectively, the bottom wall 35 resting, directly or with the interposition of suitable support elements (not shown), on the upper walls 6 of the side members 1; such bearing relationship may be extended, if desired, also to the cross members 15.

Figure 2:
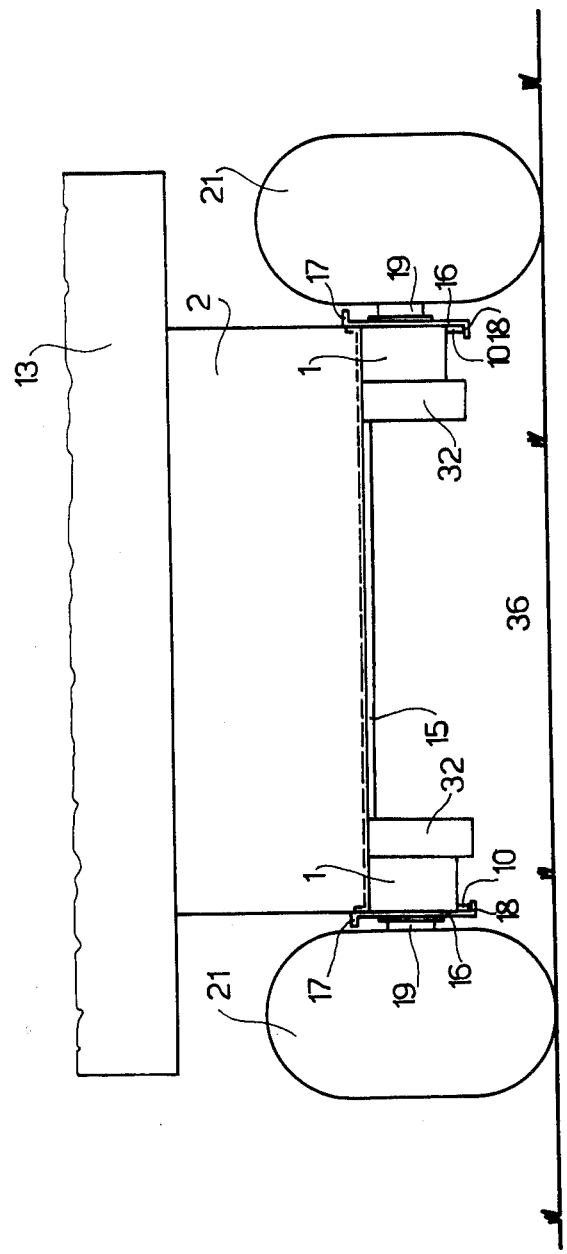
FIG. 2 is a diagrammatic front view of said chassis.

Thus, it is evident that the chassis according to the present invention has extremely reduced overall dimensions which are concentrated only adjacent the wheels of the vehicle, thus leaving completely free a space 36 (FIG. 2) of considerable height between the wheels 21; an eventual obstacle which may be encountered during the ride of the vehicle does not interfere with the chassis or with the body 13, since such obstacle, when situated between the wheels, is accomodated in said space, and when situated below one of the wheels or below a side member, is surmounted by the wheel itself, so that the respective side member is moved away from the obstacle.

Furthermore, with the chassis according to the invention, the eventual operations of inspection and adjustment of the members transmitting the motion to the driving axles 20 (sprocket wheels 25, chains 26 etc.) may be effected in an extremely quick and safe manner, since it is sufficient to disconnect the plates 16 from the respective side members 1, as shown in FIG. 3; in this way, the coupling element 28 is released from the element 29, and thus all parts connected to the plate 16 result in being immediately accessible.

Moreover, the body 13 is perfectly water-tight, since it is not traversed by movable parts (axles) of the drive, as is instead the case of the prior art arrangements; it rests in a perfectly correct manner on the chassis, and the latter, together with the front and rear plates 2 and 3 respectively, provides a seating for the body which considerably simplifies the connection of the body to the chassis.

Finally, the chassis thus obtained is very sturdy and light.

It is evident that the embodiment of the present invention described herein is susceptible of modifications and variations without departing from the scope of the invention itself.

What I claim is:

1. A chassis for a vehicle which comprises an engine, first and second sets of ground-engaging wheels at opposite respective sides of the vehicle, axles upon which the ground-engaging wheels are mounted, sprocket wheels connected to the axles, and drive chains connecting the engine drivingly to the sprocket wheels, whereby all the ground-engaging wheels are driven to rotate, the chassis comprising first and second side members and at least two cross members connecting the side members together, the first and second side members supporting the first and second sets of ground-engaging wheels respectively and each having a wall for supporting thereon a portion of a body of the vehicle and each comprising a first box-shaped element which is disposed to have its open side facing outwardly of the vehicle and is connected to said cross members, and a second plate-shaped element which is releasably secured to the first element as the open side thereof, whereby the two elements each define a closed recess, and said second element having bushings fixed thereto for supporting said axles respectively with the sprocket wheels connected thereto being located within the closed recess, so that upon removal of the second element from the first element the bushings, axles, sprocket wheels and chains may be separated from the vehicle.

2. A chassis as claimed in claim 1, further comprising first and second drive members which can be connected to the engine and are disposed within the closed recesses of the first and second side members, and wherein each side member is provided with coupling means for connecting the drive member disposed in the recess thereof to one of the axles supported thereby, said coupling means being released when said second element of the side member is separated from said first element thereof.

3. A chassis as claimed in claim 2, wherein each said coupling means comprises two coupling elements of the type with front teeth, one of the coupling elements being rigidly connected to the drive member and the other being rigidly connected to said one axle.

4. A chassis as claimed in claim 2, wherein said drive members comprise respective sprocket wheels which are each housed in a box rigidly connected to said first element and communicating with the recess of the side member.

5. A chassis as claimed in claim 1, wherein said two cross members are formed by respective plates, each of which is connected to one end of each of said side members.

6. A chassis as claimed in claim 5, further comprising transverse tubular elements connected to said side members.

7. A chassis as claimed in claim 1, wherein said first element of each side member comprises a lower wall and an upper wall which are substantially parallel to each other, and a plane bottom wall which is orthogonal to said lower and upper walls, so that the cross section of said side member is substantially rectangular.

8. A chassis as claimed in claim 7, wherein those edges of the upper and lower walls of each first element which bound the open side of said first element are bent through substantially 90°, so as to provide supporting tabs for the second element secured to that first element.

* * * * *